Aug. 9, 1938.   C. B. SPASE   2,126,149
CLUTCH
Filed June 12, 1937   2 Sheets-Sheet 1

INVENTOR.
Charles B. Spase
BY Bodell & Thompson
ATTORNEYS.

Aug. 9, 1938. C. B. SPASE 2,126,149
CLUTCH
Filed June 12, 1937 2 Sheets-Sheet 2

INVENTOR.
Charles B. Spase
BY Bodell & Thompson
ATTORNEYS.

Patented Aug. 9, 1938

2,126,149

UNITED STATES PATENT OFFICE 2,126,149

CLUTCH

Charles B. Spase, Nedrow, N. Y., assignor to W. C. Lipe Inc., Syracuse, N. Y., a corporation of New York Application June 12, 1937, Serial No. 147,978

14 Claims. (Cl. 192—68)

This invention relates to friction clutches, such as are used in motor vehicles, and it has for its principal object a clutch lever and clutch spring arrangement, which is particularly simple in construction, and economical in manufacture.

More specifically, it has for its object a lever construction and arrangement through which the force of the clutch spring is applied to the pressure ring of the clutch to hold the clutch engaged, whereby the levers are held assembled by means, as a floating ring, which presses against the inner ends thereof, and has no connection with a throw-out sleeve or collar, and an arrangement of the clutch spring elements in the form of leaf springs pressing on the ring on the side opposite to that engaged by the levers.

It further has for its object a clutch in which the spring is a discoidal plate or segments of a discoidal plate in contradistinction to coiled springs.

It further has for its object an arrangement of the levers alternately with inwardly extending spring arms or segments, and an arrangement of said arms and levers relative to the floating ring against which the inner ends of the levers and the arms or segments of the spring, press.

Other minor objects apear throughout the specification.

The invention consists in the novel features and in the combinations and constructions hereinafter set forth and claimed.

In describing this invention, reference is had to the accompanying drawings in which like characters designate corresponding parts in all the views.

Figure 1:
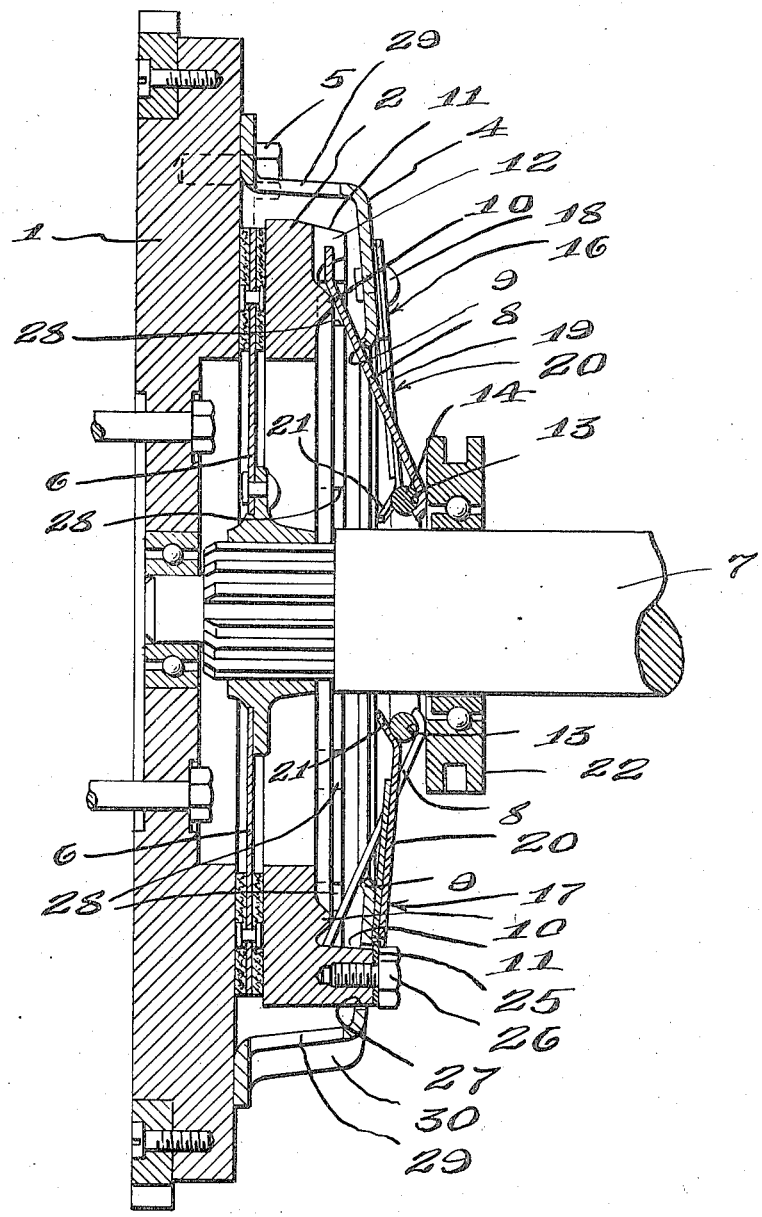
Figure 1 is a fragmentary longitudinal sectional view of a clutch embodying this invention.
Figure 2:
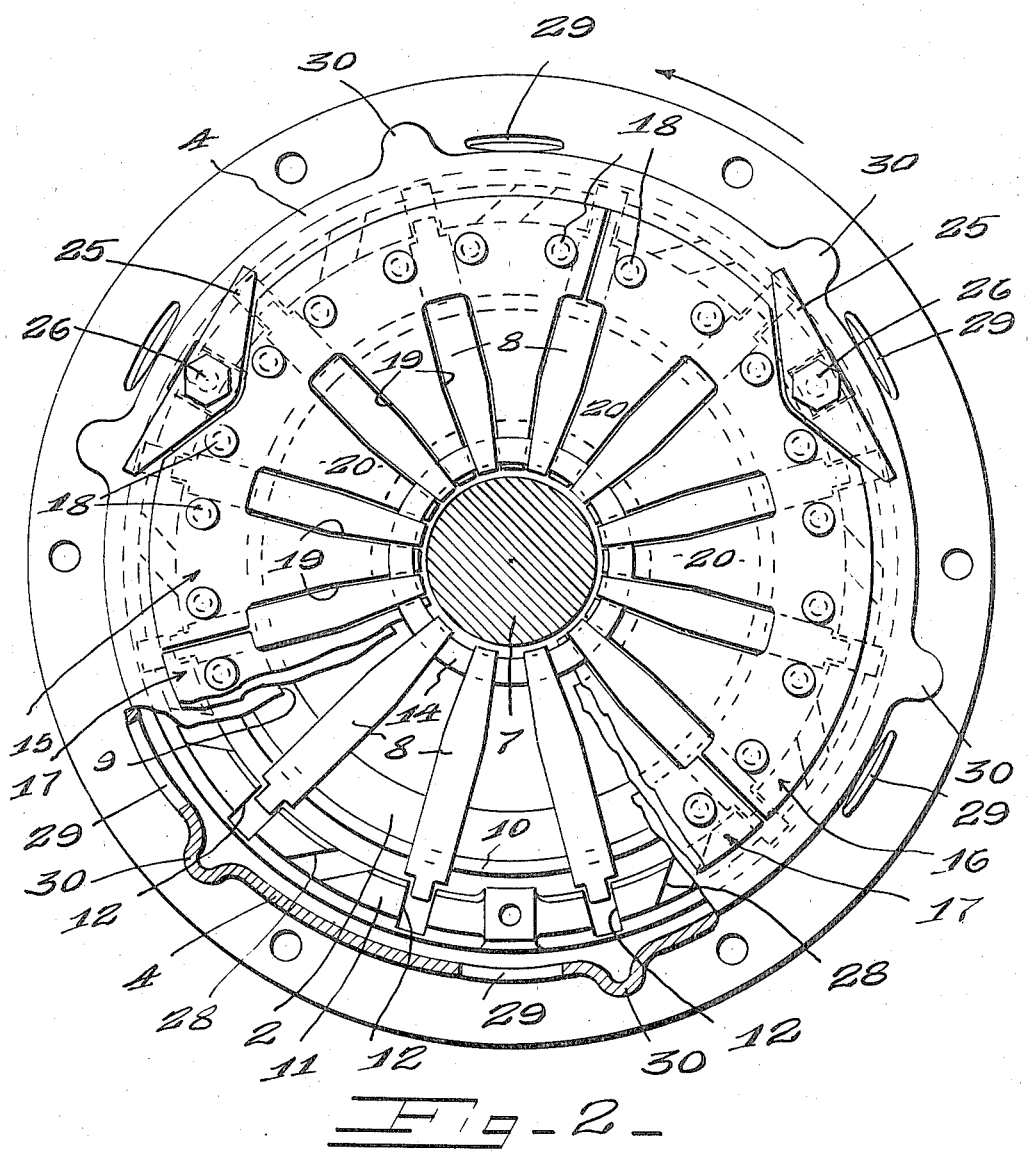
Figure 2 is a rear elevation, partly broken away and partly in section.

1 designates the driving element of the clutch, which is usually the fly wheel of the engine of the vehicle. 2 designates the pressure ring rotatable with the fly wheel. 4 designates what is commonly called the back plate, this being secured to the fly wheel, as by screws 5.

6 designates the disk or plate of the driven element, this being rotatable with and shiftable axially of the clutch shaft 7 and having friction faces on opposite sides of its outer margin for coacting with the face of the fly wheel and with the pressure ring 2.

The principal feature of the invention lies in the motion-transmitting and multiplying levers or so-called clutch levers and the clutch spring arrangement.

8 designates an annular series of clutch levers, spaced apart around the clutch shaft 7, the levers being unsecured or not pivoted but press at 9 and 10 on the back plate structure and on the pressure ring, or fulcrumed at 9 on the back plate and pressing at 10 on the pressure ring, when the clutch is engaged. The force is applied to the inner ends of the levers. The outer ends of the levers are located within a flange 11 on the rear side of the pressure ring and are formed with extensions or lugs reduced in width interlocking in notches 12 in the flange 11. The inner ends of the levers are formed arcuate or with seats 13 in which is seated a ring 14 preferably circular in cross section, the ring connecting the levers together. This ring is not connected to the throw-out sleeve or collar and is spaced from the clutch shaft.

In the clutches heretofore used, the inner ends of the clutch levers extend into a groove or channel provided on the throw-out sleeve. In the clutch of this application, the inner ends of the levers coact with the ring 14 and are not interlocked with the throw-out sleeve or collar.

The clutch spring consists of a discoidal spring plate or segments of a discoidal plate, the plate or the segments thereof being secured at their outer margins or ends to the back plate structure and being slotted to form inwardly extending arms which press against the ring 14 in opposition to the inner ends of the levers 8.

As here illustrated, the discoidal spring is formed in three segments 15, 16 and 17, which are secured, as by rivets 18, or in any other manner, at their outer margins, to the back plate structure, the segments being formed with slots 19 extending outwardly from the central portion thereof providing spring arms 20. The levers 8 extend inwardly obliquely through the slots 19 from the inner side of the spring disk or the segments thereof to the other side, through the slots 19. The arms 20 form in effect leaf springs, and in order to obtain a sufficient spring effect, the spring disk or element may be laminated, as seen in Figure 1. The inner ends of the spring arms 19 are deflected inwardly at 21, that is, the portions opposed to the seats 13 are deflected or inclined inwardly to form wedge or cam surfaces pressing on the ring 14 and acting to center it relatively to the axis of the clutch or the shaft 7. These inclined ends 21 constitute means for centering the floating ring 14.

22 designates the throw-out sleeve or collar, which is slidable axially of the shaft 7, and which, when operated, thrusts against the inner ends of the levers 8 to disengage the clutch against the action of the spring arms 20. The throw-out collar is operated in the usual manner by a yoke or fork, not shown, on the shaft on which the clutch pedal is mounted.

The pressure ring 2 is released or pulled out, when the throw-out collar is operated, by means of leaf springs 25, in contradistinction to coil springs, pressing at their ends against the outer side of the back plate and being connected between their ends to the pressure ring 2 by screws 26 extending through holes 27 in the back plate. Preferably, the pressure ring has projections extending through said holes 27 into which the screws 26 thread. By moving the throw-out collar 22 inwardly, the springs 25 react and shift rearwardly slightly.

In order to ventilate the clutch, the pressure ring is provided with passages 28 therethrough and the peripheral wall of the back plate formed with outlet openings 29 and also with projections 30 in advance of the outlet openings 29, with respect to the direction of rotation, as indicated by the arrow. The passages 28 are also inclined in a tangential direction to facilitate the outward passage of the air, when the clutch is rotating. The projections 30 on the back plate 4, which rotates as a unit with the fly wheel and with the pressure ring 2, are located to create a vacuum, and hence a draft through the passages 29 and 28 during the rotation of the parts, as a unit.

This clutch construction is particularly advantageous in that the spring and clutch levers are readily assembled and held in position without connection to a throw-out sleeve, and further in that owing to the spring arrangement, the spring takes up a minimum of axial space and is located away from the source of heat generated in the clutch, when in use.

What I claim is:

1. In a clutch, the combination with a driving element, a pressure ring rotatable with the driving element, a back plate, a driven element including a friction disk extending between the driving element and the pressure ring, a clutch shaft on which the disk is mounted, and a throw-out collar shiftable axially of the clutch shaft; of clutch levers, the levers slidably pressing on the pressure ring and the back plate, leaf spring elements carried by the back plate and extending inwardly toward the inner ends of the levers, the throw-out collar thrusting, when operated, against the inner ends of the levers in one direction, a ring interposed between the inner ends of the levers and the inner ends of the spring elements, said spring elements acting on the ring in opposition to the thrust of the throw-out collar, when the collar is actuated.

2. In a clutch, the combination with a driving element, a pressure ring rotatable with the driving element, a back plate, a driven element including a friction disk extending between the driving element and the pressure ring, a clutch shaft on which the disk is mounted, and a throw-out collar shiftable axially of the clutch shaft; of clutch levers, the levers pressing on the pressure ring and the back plate, leaf spring elements carried by the back plate and extending inwardly toward the inner ends of the levers and arranged alternately with the levers, the throw-out collar acting, when operated, against the inner ends of the levers in one direction, a ring interposed between the inner ends of the levers and the inner ends of the spring elements, said spring elements acting on the ring in opposition to the thrust of the throw-out collar, when the collar is actuated.

3. In a clutch, the combination with a driving element, a pressure ring rotatable with the driving element, a back plate, a driven element including a friction disk extending between the driving element and the pressure ring, a clutch shaft on which the disk is mounted, and a throw-out collar shiftable axially of the clutch shaft; of clutch levers pressing on the pressure ring and the back plate, leaf spring elements carried by the back plate and extending inwardly toward the inner ends of the levers, the throw-out collar thrusting, when operated, against the inner ends of the levers in one direction, a ring encircling the shaft and spaced therefrom, and interposed between the inner ends of the levers and the inner ends of the spring elements, said spring elements acting on the ring in opposition to the thrust of the throw-out collar, when the collar is operated, the inner ends of the spring elements being formed with wedge faces coacting with the ring to center the ring relatively to the axis of the clutch.

4. In a clutch, the combination with a driving element, a pressure ring rotatable with the driving element, a back plate, a driven element including a friction disk extending between the driving element and the pressure ring, a clutch shaft on which the disk is mounted, and a throw-out collar shiftable axially of the clutch shaft; of clutch levers pressing on the pressure ring and the back plate, leaf spring elements carried by the back plate and extending inwardly toward the inner ends of the levers, the throw-out collar thrusting, when operated, against the inner ends of the levers in one direction, a ring encircling the shaft and spaced therefrom, and interposed between the inner ends of the levers and the inner ends of the spring elements, said spring elements acting on the ring in opposition to the thrust of the throw-out collar, when the collar is operated, said ring being held in position by the pressure of the spring elements pressing the same against the inner ends of the levers, and wedge means on one of said parts between which the ring is compressed for centering the ring relatively to the axis of the clutch.

5. In a clutch, the combination with a driving element, a pressure ring rotatable with the driving element, a back plate, a driven element including a friction disk extending between the driving element and the pressure ring, a clutch shaft on which the disk is mounted, and a throw-out collar shiftable axially of the clutch shaft; of clutch levers pressing on the pressure ring and the back plate, leaf spring elements secured at one end to the back plate and extending inwardly and having arms extending obliquely crosswise of the levers to the inner sides thereof, and a ring interposed between the inner ends of the arms and the inner ends of the levers and said spring elements thrusting axially outwardly against said ring, the throw-out collar thrusting, when operated, in the opposite direction against the inner ends of the levers.

6. In a clutch, the combination with a driving element, a pressure ring rotatable with the driving element, a back plate, a driven element including a friction disk extending between the driving element and the pressure ring, a clutch shaft on which the disk is mounted, and a throw-out collar shiftable axially of the clutch shaft; of clutch levers pressing on the pressure ring and the back plate, leaf spring means secured to the back plate and having arms extending inwardly toward the inner ends of the levers, said arms alternating with the levers and extending obliquely crosswise thereof from the outer sides to the inner sides of the levers, and means against which the inner ends of said arms and the inner ends of the levers press in opposite directions, the arms tending to press the inner ends of the levers axially outward, the throw-out collar pressing, when operated, in the opposite direction against the inner ends of the levers.

7. In a clutch, the combination with a driving element, a pressure ring rotatable with the driving element, a back plate, a driven element including a friction disk extending between the driving element and the pressure ring, a clutch shaft on which the disk is mounted, and a throw-out collar shiftable axially of the clutch shaft; of clutch levers pressing on the pressure ring and the back plate, leaf spring means secured to the back plate and having arms extending inwardly toward the inner ends of the levers, said arms alternating with the levers and extending obliquely crosswise thereof from the outer sides to the inner sides of the levers, and a ring interposed between the inner ends of said arms and the inner ends of the levers, the throw-out collar pressing, when operated, against the inner ends of the levers in opposition to said arms.

8. In a clutch, the combination with a driving element, a pressure ring rotatable with the driving element, a back plate, a driven element including a friction disk extending between the driving element and the pressure ring, a clutch shaft on which the disk is mounted, and a throw-out collar shiftable axially of the clutch shaft; of clutch levers pressing on the pressure ring and the back plate, leaf spring means secured to the back plate and having arms extending inwardly toward the inner ends of the levers, said arms alternating with the levers and extending obliquely crosswise thereof from the outer sides to the inner sides of the levers, a ring encircling the shaft and spaced therefrom, and interposed between the inner ends of said arms and the inner ends of the levers, the throw-out collar pressing, when operated, against the inner ends of the levers in opposition to said arms, the inner ends of the levers and the inner ends of said arms being formed to provide a wedge seat for said ring to center the ring with the axis of the clutch.

9. In a clutch, the combination with a driving element, a pressure ring rotatable with the driving element, a back plate, a driven element including a friction disk extending between the driving element and the pressure ring, a clutch shaft on which the disk is mounted, and a throw-out collar shiftable axially of the clutch shaft; of clutch levers pressing on the pressure ring and the back plate, leaf spring means secured to the back plate and having arms extending inwardly toward the inner ends of the levers, said arms alternating with the levers and extending obliquely crosswise thereof from the outer sides to the inner sides of the levers, a ring encircling the shaft and spaced therefrom and interposed between the inner ends of said arms and the inner ends of the levers, the throw-out collar pressing, when operated, against the inner ends of the levers in opposition to said arms, the ring being cylindrical in cross section, the inner ends of the levers being formed with arcuate seats for the ring on one side thereof and the inner ends of said arms being provided with cam faces acting on the ring in opposition to the seats and tending to wedge the ring into concentric relation with the axis of the clutch.

10. In a clutch, the combination with a driving element, a pressure ring rotatable with the driving element, a back plate, a driven element including a friction disk extending between the driving element and the pressure ring, a clutch shaft on which the disk is mounted and a throw-out collar shiftable axially of the clutch shaft; of clutch levers slidably pressing on the pressure ring and the back plate, clutch spring means comprising leaf springs secured at their outer ends to the back plate structure and extending radially inwardly, the leaf springs alternating with the levers, and the inner ends thereof being in different radial planes from the inner ends of the levers, whereby the inner ends of the levers and springs are staggered with respect to each other, and means interposed between the inner ends of the springs and the inner ends of the levers for coupling the springs and levers together, whereby shifting force applied by the throw-out collar to the levers in one direction is applied to the springs, and the force of the springs applied to the levers in the opposite direction through said means.

11. In a clutch, the combination with a driving element, a pressure ring rotatable with the driving element, a back plate, a driven element including a friction disk extending between the driving element and the pressure ring, a clutch shaft on which the disk is mounted and a throw-out collar shiftable axially of the clutch shaft; of clutch levers slidably pressing on the pressure ring and the back plate, clutch spring means comprising leaf springs secured at their outer ends to the back plate structure and extending radially inwardly, the leaf springs alternating with the levers, and means interposed between the inner ends of the springs and the inner ends of the levers for coupling the springs and levers together, whereby shifting force applied by the throw-out collar to the levers in one direction is applied to the springs, and the force of the springs applied to the levers in the opposite direction, said means including a ring common to the inner ends of all the levers and the springs.

12. In a clutch, the combination with a driving element, a pressure ring rotatable with the driving element, a back plate, a driven element including a friction disk extending between the driving element and the pressure ring, a clutch shaft on which the disk is mounted and a throw-out collar shiftable axially of the clutch shaft; of slidably mounted clutch levers slidably pressing on the pressure ring and the back plate, clutch spring means comprising leaf springs secured at their outer ends to the back plate structure and extending radially inwardly, the leaf springs alternating with the levers, and means interposed between the inner ends of the springs and the inner ends of the levers for coupling the springs and levers together, whereby shifting force applied by the throw-out collar to the levers in one direction is applied to the springs, and the force of the springs applied to the levers in the opposite direction, the inner ends of the springs extending obliquely crosswise of the levers to the inner sides thereof, and said means including a ring between the inner ends of the levers and the springs.

13. In a clutch, the combination with a driving element, a pressure ring rotatable with the driving element, a back plate, a driven element including a friction disk extending between the driving element and the pressure ring, a clutch shaft on which the disk is mounted and a throw-out collar shiftable axially of the clutch shaft; of slidably mounted clutch levers slidably pressing on the pressure ring and the back plate, clutch spring means comprising leaf springs secured at their outer ends to the back plate structure and extending radially inwardly, the leaf springs alternating with the levers, and extending obliquely crosswise of the levers at the inner ends of the levers and springs, and means at the inner ends of the levers and the springs and coacting therewith to hold the slidably mounted levers from displacement and transferring the axial force of the springs to the levers.

14. In a clutch including the usual driving element, pressure ring rotatable with the driving element, back plate, driven element extending between the driving element and the pressure ring, clutch shaft on which the driven element is mounted and throw-out collar shiftable axially of the clutch shaft, the combination of an annular series of clutch lever elements pressing on the pressure ring and the back plate, an annular series of leaf spring elements pressing on the back plate and extending inwardly toward the inner ends of the levers, and a ring located at the inner ends of the lever and spring elements and interlocked therewith, said lever and spring elements pressing in opposite axial directions against the ring, the throw-out collar coacting, when actuated, to operate the levers against the spring elements.

CHARLES B. SPASE.